United States Patent [19]
Erickson

[11] Patent Number: 5,457,735
[45] Date of Patent: Oct. 10, 1995

[54] METHOD AND APPARATUS FOR QUEUING RADIO TELEPHONE SERVICE REQUESTS

[75] Inventor: Paul Erickson, Palatine, Ill.

[73] Assignee: Motorola, Inc., Schaumburg, Ill.

[21] Appl. No.: 189,618

[22] Filed: Feb. 1, 1994

[51] Int. Cl.[6] .................................................. H04M 11/00
[52] U.S. Cl. ........................................... 379/58; 379/266
[58] Field of Search .................................. 379/58, 59, 60, 379/63, 266, 309; 455/33.1, 56.1, 54.1, 67.1; 395/650, 600, 800

[56] References Cited

U.S. PATENT DOCUMENTS

| | | | |
|---|---|---|---|
| 5,025,254 | 6/1991 | Hess | 379/63 |
| 5,226,071 | 7/1993 | Bolliger et al. | 379/60 |
| 5,327,557 | 7/1994 | Emmond | 395/650 |

Primary Examiner—Curtis Kuntz
Assistant Examiner—Michael B. Chernoff
Attorney, Agent, or Firm—Steven G. Parmelee

[57] ABSTRACT

At the access control gateway (105) of a communications system (100) sharing common resources and providing telephone and dispatch services, a service request queue (301) is provided where requests are queued when communication resources are not available. Queuing of dispatch requests does not differ from that used in current dispatch-only systems where all requests are queued for an indeterminate period of time when resources are not available. Telephone service requests, however, are queued for a finite period of time. Should resources become available during the finite period of time, the resources are provided and the request is granted. If resources do not become available before the finite period of time expires then the request is removed from the queue and terminated.

5 Claims, 2 Drawing Sheets

METHOD AND APPARATUS FOR QUEUING RADIO TELEPHONE SERVICE REQUESTS

FIELD OF THE INVENTION

This invention relates generally to radio communications, and more particularly to radio telephone communication services.

BACKGROUND OF THE INVENTION

Radio communication systems are known in the art. Recently, communications systems that each accommodate a variety of communications services have been developed. For example, U.S. Ser. No. 08/131,535 entitled "Method And Apparatus For Supporting At Least Two Communication Services In A Communication System", filed on Oct. 1, 1993 by Krebs, et al. discloses a communication system that will support both telephone services and dispatch services. Dispatch services and telephone services differ in a variety of ways from one another, and certain problems can be encountered when providing common infrastructure to support both services. For example, regardless of which service is requested, sufficient communication resources may not exist to immediately support the request. When this occurs in a dispatch context, a dispatch system will typically automatically notify the dispatch user of subsequent availability of the resource. Contrary to this, the telephone user will not be subsequently advised of resource availability. As a result, it can be seen that different users of a system can have different expectations as to how that system will respond to their requests for service.

In order to notify dispatch users that a previously denied communication request can now be accommodated, the system infrastructure will typically maintain a request queue. In this way, with or without the use of additional degrees of prioritization, previously denied service requests can be met. Therefore, although dispatch users are typically confronted with a 5 to 20 percent probability of unavailability of service at the time of initially requesting dispatch service, the dispatch user also typically expects to be notified of service availability within a few seconds to a few minutes.

Since telephone users are typically not subsequently notified of resource availability once their initial request has been denied, the infrastructure that accommodates their communications processing does not maintain a request queue. In the ordinary situation, this does not provide a problem. When, however, both services share a common infrastructure and a common set of resources, a variety of problems can result. In particular, during particularly busy request conditions, the dispatch users may receive an undue amount of system resources with respect to telephone users, since the dispatch users are queued, and hence have a considerable advantage over their unqueued counterparts.

Accordingly, a need exists to better accommodate the need for telephone subscriber units in a multi-service shared infrastructure communications environment to obtain requested communications resources.

BRIEF DESCRIPTION OF THE DRAWINGS

FIG. 3 depicts a representation of a queue in accordance with the present invention.

FIG. 4 depicts a representation of a queue in accordance with the present invention.

FIG. 5 depicts a representation of a queue in accordance with the present invention.

FIG. 6 depicts a representation of a queue in accordance with the present invention.

FIG. 7 depicts a representation of a queue in accordance with the present invention.

DESCRIPTION OF A PREFERRED EMBODIMENT

Figure 1:
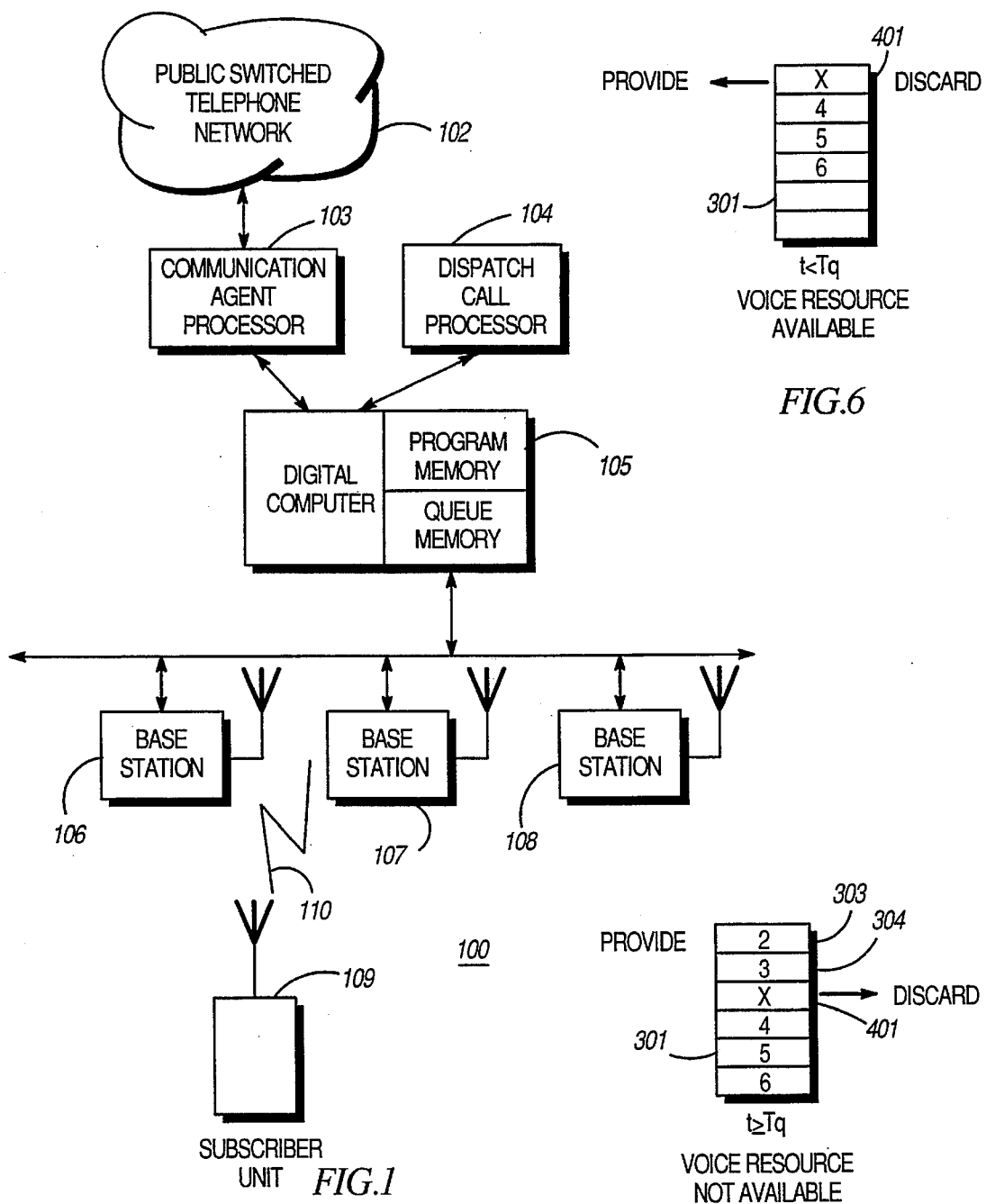
FIG. 1 depicts a block diagram detailing a communications system configured in accordance with the present invention.

FIG. 1 depicts an access control gateway (105) configured in accordance with the present invention in a communications system (100) supporting both telephone and dispatch services. Communications systems supporting multiple services are known in the art and an example is U.S. Ser. No. 08/131,535 entitled "Method And Apparatus For Supporting At Least Two Communication Services In A Communication System", filed on Oct. 1,1993 by Krebs et al., to the same assignee. This patent application is incorporated herein by this reference. Briefly stated, the access control gateway (105) is coupled to a public switched telephone network (102) through a communication agent processor (103) to support telephone services. To support dispatch services, a dispatch call processor (104) is coupled to the access control gateway (105). In order to provide telephone and dispatch services to the subscriber unit (109), a plurality of radio base stations (106 through 108) are coupled to the access control gateway (105). The access control gateway (105) includes a digital computer having a queue memory and a program memory, the program memory having a program stored thereon to be executed by the digital computer. The digital computer can comprise of current prior art computational platforms. (Such platforms are well understood in the art and therefore will not be further described here).

In this particular embodiment, the access control gateway (105) determines the radio services requested by the subscriber unit (109) via the base stations (106 through 108) and relays the request to the appropriate processor (103 and 104). To support the request for radio service from a system subscriber, the access control gateway (105) receives resource allocations from the processors (103 and 104) and relays this information to the subscriber unit (109) via the base stations (106 through 108).

Figure 2:
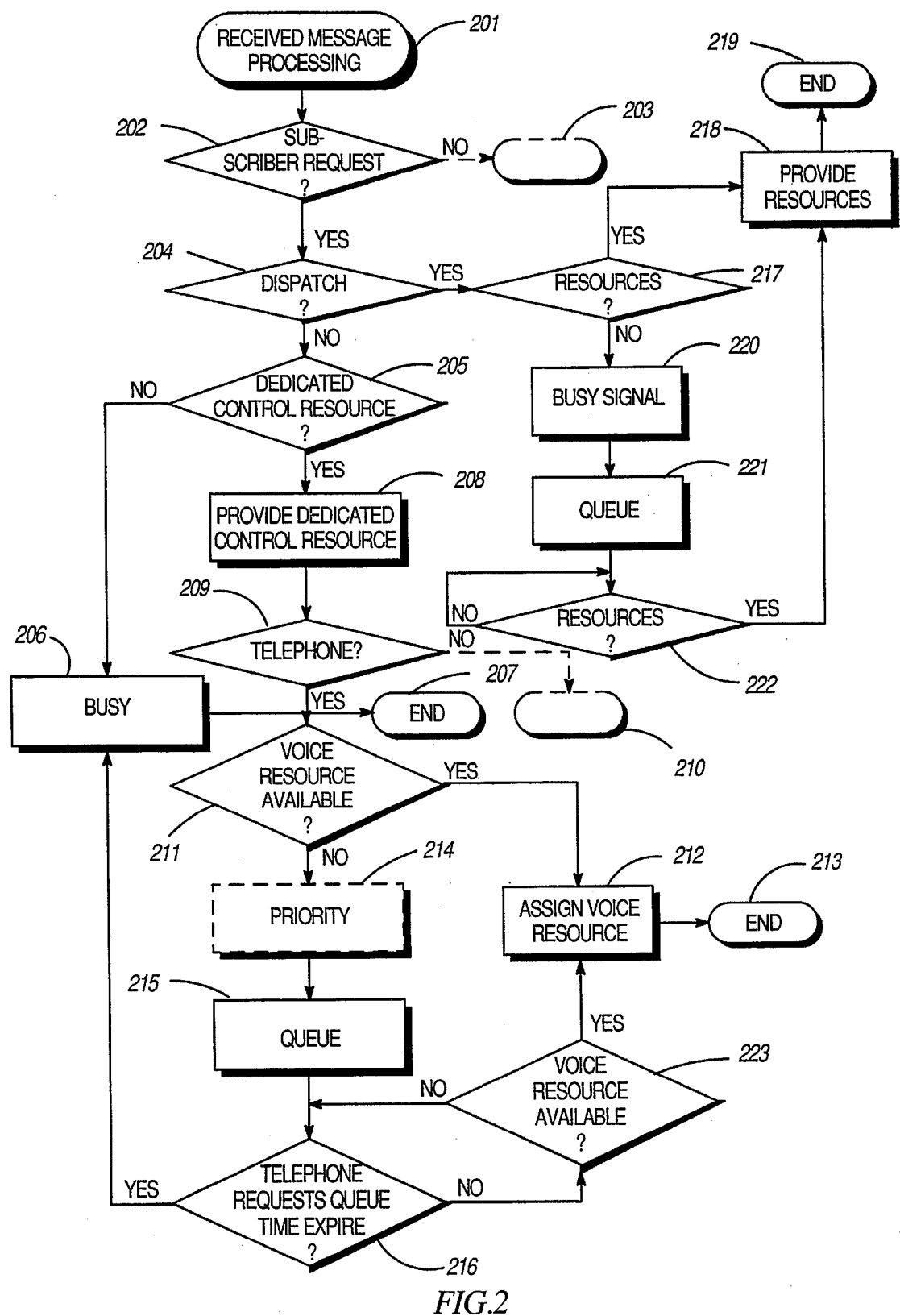
FIG. 2 depicts a flow diagram detailing operation in accordance with the present invention.

With the above infrastructure embodiment in mind, and with reference to FIGS. 1 and 2, the operation of the system (100) in response to a dispatch service request can now be described. When a system subscriber unit (109) sends out a request (110) for dispatch service, the request is received on a primary control channel of at least one of the base stations (106 through 108) and relayed to the access control gateway (105) where a received message process (201) begins. A determination is made as to whether the subscriber unit request (202) is valid. If it is not valid then the request is processed by prior art processes (203), an example of which may include logging the details of the request before terminating the request. However, if the subscriber unit request (202)is valid and is for dispatch services (204) when radio communication resources (217) are available, then resources will be provided (218) before ending (219) the request.

Should resources (217) not be available then a busy signal (220) will be sent to the subscriber unit (109) through the appropriate base stations (106 through 108), the request will be put in a queue (221) for an indeterminate period of time and a continuous loop started to repeatedly check whether resources (222) are later available. When resources become available they will be provided (218) before ending (219) the request. As a result, all requests for dispatch services will be provided with resources either immediately, without queuing when resources are available, or after an indeterminate period of time pending availability of a communication resource. Such processing of a dispatch service request is well established in the art and no further detail is provided here.

The operation of the system (100) in response to a telephone service request can now be described. Upon determining that the request is not for dispatch services (204) the process determines (205) if a dedicated control resource is presently available. If not the process sends a busy signal comprising a service rejection message (206) out to the subscriber unit (109) and terminates (207) the process. Otherwise, the process provides (208) a dedicated control resource and the subscriber unit (109) uses the assigned resource to make a service request (209). If the request is not for telephone service then other processes as well known in the art would be initiated (210).

When voice resources are available (211) such a resource will be provided (212) and the process concludes (213). If voice resources are not available (211), however, then the process queues (215) the request. (Optionally, a priority (214) for the request may be determined that can be compared against other queued requests before putting it in the queue (215), allowing at least some telephone service requests to have a priority that exceeds a corresponding priority for at least some requests for dispatch services.)

The process then determines (216) whether the request has been in the queue for no more than a predetermined finite period of time. Preferably, the finite period of time should not exceed a time that would likely lead an ordinary user to conclude that the request had somehow failed. In this particular embodiment, the finite period of time is 15 seconds. Other periods of time, for example from one second to one minute, may be acceptable depending upon the particular application and the likely expectations of the average user with respect to acceptable wait times between making a service request and receiving the service. The process then continues checking if the finite period of time has expired (216) and if voice resources have become available (223). If voice resources have become available before the finite period of time has expired, then the voice resources are provided (212) and the process concludes (213). If voice resources do not become available to support the request prior to expiration of the finite period of time (216), then the process removes the request from the queue and sends (206) a busy signal to the subscriber unit (109) before concluding (207).

With reference to FIGS. 3 through 7, an illustrative description of queuing in accordance with this embodiment follows. FIG. 3 depicts a queue (301) where requests (302 through 304) are queued in chronological order of occurrence, when resources are not available, and where the request (302) at the top of the queue will be the next to be served when resources become available. Serving the request (302) at the top of the queue results in all other requests (303 and 304) in the queue moving one position up. Requests occurring later will be added to the bottom of the queue.

At time t=0 there are 3 requests (302 through 304) for resources in the queue (301). With reference to FIG. 4, at a later time t=t1, a new request X (401) for resources has occurred and is placed in the queue after request 3 (304). As a result, request X (401) will only be served when it moves to the top of the queue (301), after requests 1,2, and 3 (302 through 304) have been served or otherwise removed. This type of queue operation is known in the art as a first-in-first-out queue and further details need not be provided here.

As an alternative example, FIG. 5 depicts the queue (301), at time t=t1 when a new request X (401) having an assigned priority level higher than that of request 3 (304) occurs. The new request X (401) replaces request 3 (304) in the queue (301) because of this higher priority, and moves request 3 (304) to a lower position in the queue.

As another example, an emergency request could be assigned the highest priority for such a communications resource queue (301). Such an emergency request would be immediately placed at the top of the queue (301) and would be the next request to be served when resources become available. All requests that were in the queue (301) prior to the emergency request would be moved to lower positions in the queue.

FIG. 6 depicts the queue (301) at time t<Tq, where Tq is the finite time threshold. Request X (401) has moved to the top of the queue (301) before the finite period of time has expired. So positioned, this request X (401) receives the next resource that becomes available before expiration of the finite time.

FIG. 7 depicts the queue (301) at time t≧Tq where the request X (401) has been in the queue longer than the finite period of time and did not receive a resource during that time. The queue (301) therefore discards request X (401).

The duration of the finite period of time determines the maximum amount of time a request may spend waiting in the queue. A greater duration provides a higher probability of the request reaching the top of the queue and being served. However, an ordinary user making a request for telephone service, when communication resources are not available, will not typically accept waiting for so long a time as would lead the ordinary user to conclude that the service request had somehow failed. Hence, the finite period of time is perhaps best calculated with regard to an acceptable grade of service for system subscribers, and resource utilization.

The described communication system (100) shares common resources to provide both dispatch and telephone services. The described embodiment ensures that at least during heavy resource utilization, telephone service requests are queued to have a better probability of receiving resources. In addition, by assigning a priority to at least some requests the probability of receiving service can be manipulated to provide a desired grade of service to the subscribers. At the same time, this embodiment accommodates the expectations of the ordinary user by providing or denying service within operational parameters that at least mimic normal telephone service operation.

I claim:

1. At an access control gateway in a two-way communications system supporting telephone communication and dispatch communication, wherein both telephone communication users and dispatch communication users share common infrastructure and common resources, a method comprising the steps of:

receiving a request for radio service from a system subscriber;

when a radio communication resource is available to support the request, providing the communication resource;

when a communication resource is not currently available to support the request;

and the communication request is for dispatch communication services:

queuing the request for an indeterminate period of time pending availability of a communication resource to support the request;

providing a communication resource to support the request when a communication resource becomes available;

and when the communication request is for telephone communication services:

queuing the request for at most a finite period of time that does not exceed one minute, which is typically not as long of a time as would likely lead an ordinary user to conclude that the service request had failed;

when a communication resource becomes available to support the request prior to expiration of the finite period of time, providing the communication resource to support the request;

when a communication resource does not become available to support the request prior to expiration of the finite period of time, removing the request from the queue and terminating any further attempt to support the request.

2. The method of claim 1, wherein the finite period of time is no more than ten seconds.

3. The method of claim 1 wherein the step of receiving a request includes the step of receiving a request for radio telephone service to support an immediate call.

4. The method of claim 1, wherein the method further includes the step of:

when a communication resource is not currently available to support a request, determining a priority of the request that can be compared against other queued requests.

5. The method of claim 4, wherein the step of determining a priority includes determining a priority for requests for telephone services that exceeds a corresponding priority for at least some requests for dispatch services.

* * * * *